No. 665,077. Patented Jan. 1, 1901.
H. W. ELDER.
HEAD GATE.
(Application filed Apr. 25, 1900.)
(No Model.)
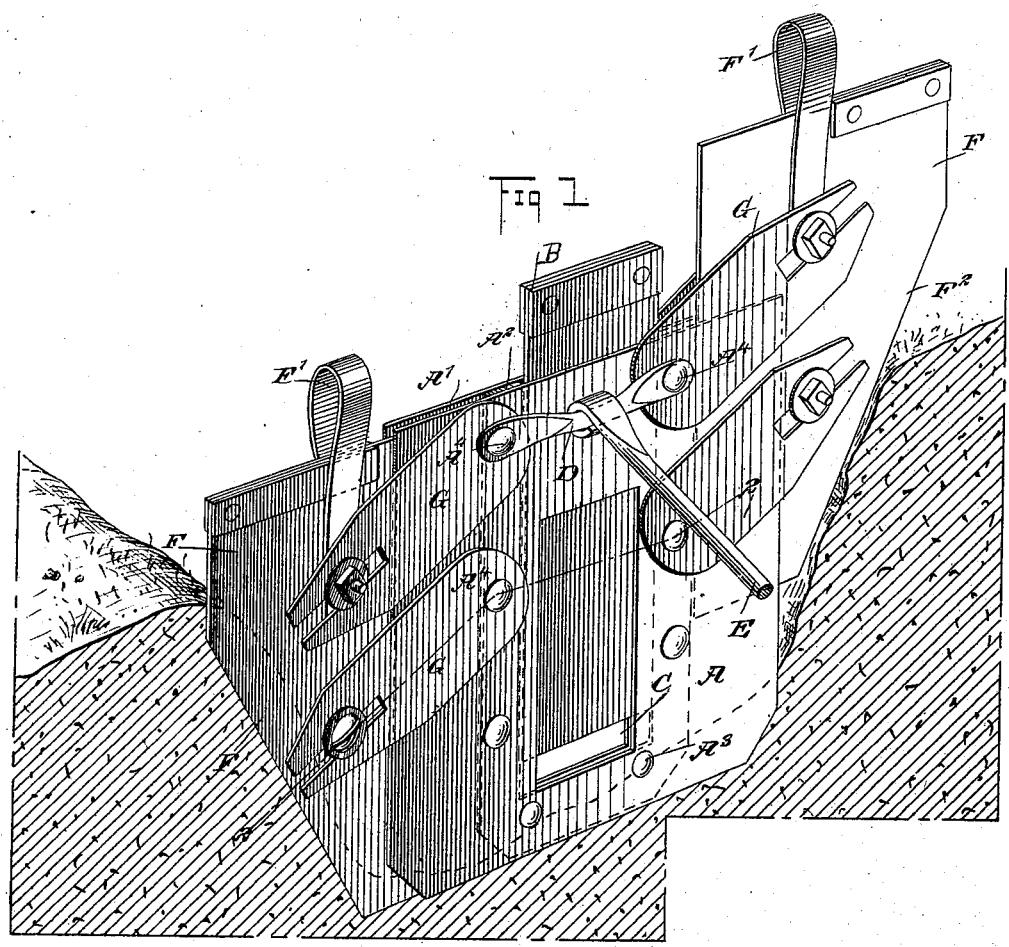
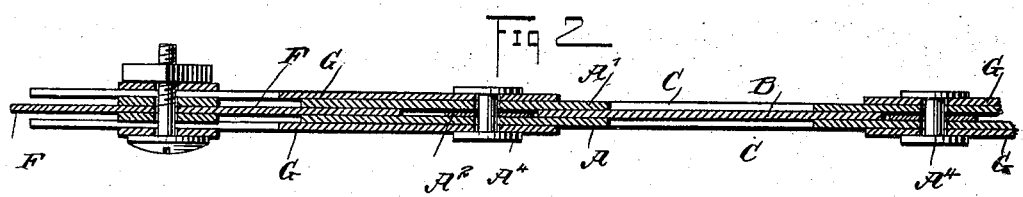
WITNESSES:
INVENTOR
Horace W. Elder.
BY
ATTORNEYS

UNITED STATES PATENT OFFICE.

HORACE WOODWORTH ELDER, OF DAWKINS, COLORADO.

HEAD-GATE.

SPECIFICATION forming part of Letters Patent No. 665,077, dated January 1, 1901.

Application filed April 25, 1900. Serial No. 14,278. (No model.)

*To all whom it may concern:*

Be it known that I, HORACE WOODWORTH ELDER, a citizen of the United States, and a resident of Dawkins, in the county of Pueblo and State of Colorado, have invented a new and Improved Head-Gate, of which the following is a full, clear, and exact description.

The object of the invention is to provide a new and improved head-gate, more especially designed for use in irrigating-ditches, to control the water flowing upon the land to be irrigated, the gate being simple and durable in construction, easily manipulated, and arranged to permit a convenient insertion in a ditch without requiring the formation of a dam.

The invention consists of novel features and parts and combinations of the same, as will be fully described hereinafter and then pointed out in the claims.

A practical embodiment of the invention is represented in the accompanying drawings, forming a part of this specification, in which similar characters of reference indicate corresponding parts in both the views.

Figure 1 is a perspective view of the gate as applied, the ditch being shown in cross-section; and Fig. 2 is an enlarged sectional plan view of the same on the line 2 2 in Fig. 1.

The improved head-gate is preferably constructed of sheet metal and is formed with a body made of front and rear plates A A', spaced apart by a U-shaped frame $A^2$ to form a guideway for the gate proper, B, adapted to close or open the registering apertures C in the plates A A' for the passage of the water from the ditch to the land to be irrigated. The plates A A', as well as the U-shaped frame $A^2$, are fastened together by suitable rivets $A^3$ and pivots $A^4$, of which the uppermost pivots $A^4$ on the inner side of the gate are connected with each other by a bar D, on which is pivoted a brace E, adapted to extend down into the ditch, so as to brace the gate against the water-head. The plates A and A' are extended beyond the sides of the side arms of the frame $A^2$ to form vertical guideways for wings F, adapted to be pushed into the side walls of the ditch or waterway in which the body of the gate is set, said wings F being preferably hung on slotted links G, fulcrumed on the pivots $A^4$, previously mentioned. The said slotted links permit lateral adjustment of the wings relatively to the body portion to accommodate the gate to the different widths of ditches.

Each of the wings F is provided on top with a suitable handle F', adapted to be taken hold of by the operator to push the wing downward, so as to cause the beveled outer edge $F^2$ to cut into the side walls of the ditch or waterway, and thereby completely dam the water in the ditch. It is understood that the beveled edges $F^2$ of the wings F correspond approximately to the shape of the inclined side walls of the ditch or waterway, and consequently it requires but little force to cause the side edges of the wings to pass into the side walls of the ground when pressed downward by the operator, as previously mentioned.

By making the body A, as well as the wings F, of thin sheet metal it is evident that the head-gate can be inserted in the ditch and the wings forced downward, so as to cut with their outer edges into the side walls of the ditch, and thereby dam the water therein.

The gate B is manipulated in the usual manner to open or close the registering apertures C, so as to let more or less water pass through the gate to the land to be irrigated, according to requirements.

Having thus fully described my invention, I claim as new and desire to secure by Letters Patent—

1. A head-gate, comprising a body having an opening and a gate therefor, side wings movable on said body and adapted to cut into the side walls of a ditch and slotted link connections between the wings and body portion, substantially as shown and described.

2. A head-gate, comprising a body having an opening and a gate therefor, guideways at the sides of said body, wings slidable in said guideways and having their outer edges beveled for cutting into the sides of a waterway, and links on which said wings are hung, the links being pivoted on said body, as set forth.

3. A head-gate, comprising a body portion made of front and rear plates, a frame for spacing said plates apart, a gate for controlling openings through said plates, wings guided between the plates at the outer side of said frame, and link connections between said wings and the body portion.

In testimony whereof I have signed my name to this specification in the presence of two subscribing witnesses.

HORACE WOODWORTH ELDER.

Witnesses:
D. A. TOOF,
G. B. SNYDER.